US009689685B2

(12) United States Patent
Gupta et al.

(10) Patent No.: US 9,689,685 B2
(45) Date of Patent: Jun. 27, 2017

(54) METHODS AND APPARATUSES FOR USE IN ROUTE NAVIGATION INVOLVING A MOBILE STATION

(75) Inventors: Rajarshi Gupta, Santa Clara, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 13/009,517

(22) Filed: Jan. 19, 2011

(65) Prior Publication Data

US 2011/0178701 A1 Jul. 21, 2011

Related U.S. Application Data

(60) Provisional application No. 61/297,209, filed on Jan. 21, 2010, provisional application No. 61/322,224, filed on Apr. 8, 2010.

(51) Int. Cl.

| | |
|---|---|
| *G01C 21/00* | (2006.01) |
| *G08G 1/00* | (2006.01) |
| *G01C 21/20* | (2006.01) |
| *G01C 21/10* | (2006.01) |
| *G01C 21/14* | (2006.01) |

(Continued)

(52) U.S. Cl.
CPC ............ *G01C 21/20* (2013.01); *G01C 21/10* (2013.01); *G01C 21/14* (2013.01); *G01C 21/206* (2013.01); *G01C 22/006* (2013.01); *G08G 1/005* (2013.01); *G08G 1/123* (2013.01); *B60L 2260/58* (2013.01); *G01C 21/343* (2013.01); *G01C 21/3438* (2013.01)

(58) Field of Classification Search
None
See application file for complete search history.

(56) References Cited

U.S. PATENT DOCUMENTS 6,047,234 A * 4/2000 Cherveny et al. ............ 701/451
6,539,300 B2 3/2003 Myr
(Continued)

FOREIGN PATENT DOCUMENTS

| JP | 2004037413 A | 2/2004 |
|---|---|---|
| JP | 2009251969 A | 10/2009 |

(Continued)

OTHER PUBLICATIONS

International Preliminary Report on Patentability PCT/US2011/021929, European Patent Office Examination.*

(Continued)

*Primary Examiner* — Fadey Jabr
*Assistant Examiner* — Kevin P Mahne
(74) *Attorney, Agent, or Firm* — Thomas Jolly

(57) ABSTRACT

Techniques are provided which may be implemented using various methods and/or apparatuses to allow for delay zone information to be gathered by one or more mobile stations used in route navigation, provided to one or more computing devices and processed in some manner to establish navigation information that may be of use by mobile stations involved in route navigation. For example, in certain instances navigation information may be indicative of an expected delay with regard to at least one known delay zone that may affect a user of the mobile station attempting to adhere to a route.

52 Claims, 5 Drawing Sheets

(51) Int. Cl.
*G08G 1/123* (2006.01)
*G01C 22/00* (2006.01)
*G08G 1/005* (2006.01)
*G01C 21/34* (2006.01)

(56) References Cited

U.S. PATENT DOCUMENTS

| | | | |
|---|---|---|---|
| 6,615,130 B2 | 9/2003 | Myr | |
| 6,839,027 B2 | 1/2005 | Krumm et al. | |
| 6,975,939 B2 | 12/2005 | Edwards et al. | |
| 7,327,262 B2 | 2/2008 | Motteram et al. | |
| 7,375,649 B2 * | 5/2008 | Gueziec | 340/905 |
| 7,512,485 B2 | 3/2009 | Hudson, Jr. et al. | |
| 7,999,701 B1 * | 8/2011 | Xu | G08G 1/123 340/993 |
| 8,019,532 B2 * | 9/2011 | Sheha et al. | 701/420 |
| 2002/0055818 A1 * | 5/2002 | Gaspard, II | 701/209 |
| 2004/0030670 A1 * | 2/2004 | Barton | 707/1 |
| 2004/0102893 A1 * | 5/2004 | Atkinson et al. | 701/117 |
| 2005/0075116 A1 * | 4/2005 | Laird et al. | 455/456.3 |
| 2007/0135134 A1 | 6/2007 | Patrick | |
| 2008/0046165 A1 | 2/2008 | Downs et al. | |
| 2008/0125959 A1 * | 5/2008 | Doherty et al. | 701/200 |
| 2008/0182564 A1 | 7/2008 | Frank et al. | |
| 2008/0183485 A1 * | 7/2008 | Drabble et al. | 705/1 |
| 2009/0299620 A1 | 12/2009 | Shin et al. | |
| 2010/0262449 A1 * | 10/2010 | Monteforte et al. | 705/8 |
| 2010/0262464 A1 * | 10/2010 | Monteforte et al. | 705/10 |
| 2011/0066366 A1 * | 3/2011 | Ellanti et al. | 701/201 |
| 2011/0070872 A1 * | 3/2011 | Ellanti et al. | 455/414.2 |
| 2011/0148626 A1 * | 6/2011 | Acevedo | 340/539.13 |
| 2011/0161432 A1 * | 6/2011 | Ellanti | 709/206 |
| 2011/0178698 A1 * | 7/2011 | Aben et al. | 701/200 |

FOREIGN PATENT DOCUMENTS

| | | | | |
|---|---|---|---|---|
| JP | 2009294153 A | | 12/2009 | |
| JP | 2010-008068 | * | 1/2010 | G01C 21/00 |
| TW | 200924542 A | | 6/2009 | |
| WO | WO-2005055494 | | 6/2005 | |
| WO | WO 2011/091168 | * | 7/2011 | G01C 21/20 |

OTHER PUBLICATIONS

Machine Translation of JP 2010-008068 (WIPO machine tanslation completed on Jan. 16, 2015).*
European Search Report—EP13158813—Search Authority—The Hague—May 14, 2013.
International Search Report and Written Opinion—PCT/US2011/021929—ISA/EPO—Apr. 27, 2011.
Narasimhan, S., "Simulation and Optimized Scheduling of Pedestrian Traffic", From geometric modeling to pedestrian navigation, Chennai, 2007, pp. 180.
Taiwan Search Report—TW100102363—TIPO—Apr. 30, 2014.

* cited by examiner

METHODS AND APPARATUSES FOR USE IN ROUTE NAVIGATION INVOLVING A MOBILE STATION

PRIORITY

This application claims priority under 35 USC 119 to U.S. Provisional Application Ser. No. 61/297,209, filed Jan. 21, 2010, and entitled "Routability Based Geofencing in an Indoor Map," which is assigned to the assignee hereof and which is incorporated herein by reference.

This application claims priority under 35 USC 119 to U.S. Provisional Application Ser. No. 61/322,224, filed Apr. 8, 2010, and entitled "Estimating Delays Traversing POIs," which is assigned to the assignee hereof and which is incorporated herein by reference.

BACKGROUND

1. Field

The subject matter disclosed herein relates to electronic devices, and more particularly to methods and apparatuses for use in route navigation involving a mobile station.

2. Information

The Global Positioning System (GPS) and other like satellite positioning systems have enabled navigation services for mobile handsets in outdoor environments. Since satellite signals may not be always be reliably received and/or acquired in an indoor environment, different techniques may be employed to enable position estimation and related navigation services. For example, mobile stations can typically obtain a position fix by measuring ranges to three or more terrestrial radio transmitters, which are positioned at known locations. Such ranges may be measured, for example, by obtaining identifying information (e.g., a MAC ID address, etc.) of such access points and measuring one or more characteristics of signals received from such access points such as, for example, signal strength, round trip delay, just to name a few examples.

By way of additional example, a mobile station, such as, a mobile phone, smart phone, etc., may perform signal-based position estimation to identify its location within a structure by taking measurements, for example of a signal strength (e.g., an RSSI) and/or propagation time (e.g., a round-trip time (RTT)) for signals exchanged with various radio transmitters (e.g., access points, beacons, etc.). A mobile station may use these or other like measurements to obtain a probability distribution over a region of space (e.g., defined using two or coordinates (x, y), etc.). Such a probability distribution or other like information may, for example, be used in a particle filter, Kalman filter, and/or other positioning mechanism using known techniques.

In some implementations, an indoor navigation system may provide a digital electronic map to mobile stations, e.g., as a user enters a particular indoor area. Such a map may show indoor features such as doors, hallways, entry ways, walls, etc., points of interest such as bathrooms, pay phones, room names, stores, etc. Such a digital electronic map may be stored at a server to be accessible by a mobile station through selection of a URL, for example. By obtaining and displaying such a map, a mobile station may overlay a current location of the mobile station (and user) over the displayed map to provide the user with additional context. Using map information indicating routing constraints, a mobile station may also apply location estimates to estimating a trajectory of the mobile station in an indoor area subject to the routing constraints.

In some particular applications, a navigation system may specify routes to a destination. For example, a mobile station application may receive a user input specifying a destination and the application may determine a route. The route may then be overlaid on a displayed map and/or provided as a sequence of instructions (e.g., walk a certain distance, make a left turn at a particular sign or point of interest, etc.). In determining a route, such an application may apply anyone of several techniques for determining an "optimal" route based upon predefined criteria. For example, such techniques may employ Dijkstra's algorithm or other graphical techniques to determine such an optimal route.

Graphical techniques for determining an optimal navigation route typically do not consider barriers or "bottlenecks" which may impede or delay a traveler along such a navigation route. As such, if reducing or minimizing travel time along a route and/or estimating an accurate transition time or time of arrival is of importance to a traveler, such graphical techniques may not provide the desired result.

SUMMARY

In accordance with an example implementation, a method may be provided for use with a mobile station. The method may comprise: estimating a navigation progress with regard to a route; identifying a wait starting time of at least one delay zone portion of the route based, at least in part, on the navigation progress; identifying a wait ending time of the at least one delay zone portion of the route; gathering delay zone information associated with at least part of a period of waiting time between the wait starting time and the wait ending time; and selectively transmitting at least a portion of the delay zone information to at least one other device.

In accordance with another example implementation, an apparatus may be provided for use with a mobile station. The apparatus may comprise: means for estimating a navigation progress with regard to a route; means for identifying a wait starting time of at least one delay zone portion of the route based, at least in part, on the navigation progress; means for identifying a wait ending time of the at least one delay zone portion of the route; means for gathering delay zone information associated with at least part of a period of waiting time between the wait starting time and the wait ending time; and means for selectively transmitting at least a portion of the delay zone information to at least one other device.

In accordance with yet another example implementation, an apparatus may be provided for use with a mobile station having a network interface. The apparatus may comprise at least one processing unit to: estimate a navigation progress with regard to a route; identify a wait starting time of at least one delay zone portion of the route based, at least in part, on the navigation progress; identify a wait ending time of the at least one delay zone portion of the route; gather delay zone information associated with at least part of a period of waiting time between the wait starting time and the wait ending time; and selectively initiate transmission of at least a portion of the delay zone information to at least one other device via the network interface.

In accordance with still another example implementation, an article of manufacture may be provided which comprises a non-transitory computer readable medium having stored therein computer-implementable instructions executable by one or more processing units of a mobile station to: estimate a navigation progress with regard to a route; identify a wait starting time of at least one delay zone portion of the route based, at least in part, on the navigation progress; identify a wait ending time of the at least one delay zone portion of the route; gather delay zone information associated with at least part of a period of waiting time between the wait starting time and the wait ending time; and selectively initiate transmission of at least a portion of the delay zone information to at least one other device.

In accordance with an example implementation, a method may be provided for use with at least one computing device. The method may comprise: obtaining delay zone information gathered by at least one mobile station associated with a period of waiting time experienced by the at least one mobile station during a route navigation; and in response to determination that the delay zone information is to be associated with a known delay zone, determining an expected delay time for the known delay zone based, at least in part, on the delay zone information; and providing navigation information for use by at least one other mobile station, the navigation information being based, at least in part, on the expected delay time for the known delay zone.

In accordance with another example implementation, an apparatus may be provided for use in at least one computing device. The apparatus may comprise: means for obtaining delay zone information gathered by at least one mobile station associated with a period of waiting time experienced by the at least one mobile station during a route navigation; means for determining whether the delay zone information is to be associated with a known delay zone; means for determining an expected delay time for the known delay zone based, at least in part, on the delay zone information, in response to a determination that the delay zone information is to be associated with a known delay zone; means for generating navigation information for use by at least one other mobile station, the navigation information being based, at least in part, on the expected delay time for the known delay zone; and means for providing the navigation information to the at least one other mobile station.

In accordance with yet another example implementation, an apparatus may be provided for use in at least one computing device having a network interface. The apparatus may comprise at least one processing unit to: obtain delay zone information gathered by at least one mobile station associated with a period of waiting time experienced by the at least one mobile station during a route navigation; in response to determination that the delay zone information is to be associated with a known delay zone, determine an expected delay time for the known delay zone based, at least in part, on the delay zone information; generate navigation information for use by at least one other mobile station, the navigation information being based, at least in part, on the expected delay time for the known delay zone; and initiate transmission of the navigation information to the at least one other mobile station via the network interface.

In accordance with still another example implementation, an article of manufacture may be provided which comprises a non-transitory computer readable medium having stored therein computer-implementable instructions executable by one or more processing units of a computing device having a network interface to: obtain delay zone information gathered by at least one mobile station associated with a period of waiting time experienced by the at least one mobile station during a route navigation; determine whether the delay zone information is to be associated with a known delay zone; determine an expected delay time for the known delay zone based, at least in part, on the delay zone information, in response to a determination that the delay zone information is to be associated with a known delay zone; generate navigation information for use by at least one other mobile station, the navigation information being based, at least in part, on the expected delay time for the known delay zone; and initiate transmission of the navigation information to the at least one other mobile station via the network interface.

In accordance with an example implementation, a method for use with a mobile station may comprise: obtaining an expected delay time for at least one known delay zone, the expected delay time being associated with a specific period of time and based, at least in part, on previously gathered delay zone information associated with at least one other mobile station with regard to the at least one known delay zone; establishing a route between a starting point and a destination position, wherein by substantially adhering to the route the mobile station is expected to at least enter the known delay zone during the specific period of time; and determining an estimated time of arrival at the destination point based, at least in part, on the expected delay time.

In accordance with another example implementation, an apparatus may be provided for use in a mobile station. The apparatus may comprise: means for obtaining an expected delay time for at least one known delay zone, the expected delay time being associated with a specific period of time and based, at least in part, on previously gathered delay zone information associated with at least one other mobile station with regard to the at least one known delay zone; means for establishing a route between a starting point and a destination position, wherein by substantially adhering to the route the mobile station is expected to at least enter the known delay zone during the specific period of time; and means for determining an estimated time of arrival at the destination point based, at least in part, on the expected delay time.

In accordance with yet another example implementation, an apparatus may be provided for use in a mobile station. The apparatus may comprise: at least one processing unit to: obtain an expected delay time for at least one known delay zone, the expected delay time being associated with a specific period of time and based, at least in part, on previously gathered delay zone information associated with at least one other mobile station with regard to the at least one known delay zone; establish a route between a starting point and a destination position, wherein by substantially adhering to the route the mobile station is expected to at least enter the known delay zone during the specific period of time; and determine an estimated time of arrival at the destination point based, at least in part, on the expected delay time.

In accordance with still another example implementation, an article of manufacture may be provided with comprises a non-transitory computer readable medium having stored therein computer-implementable instructions executable by one or more processing units of a mobile station to: obtain an expected delay time for at least one known delay zone, the expected delay time being associated with a specific period of time and based, at least in part, on previously gathered delay zone information associated with at least one other mobile station with regard to the at least one known delay zone; establish a route between a starting point and a destination position, wherein by substantially adhering to the route the mobile station is expected to at least enter the known delay zone during the specific period of time; and determine an estimated time of arrival at the destination point based, at least in part, on the expected delay time.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
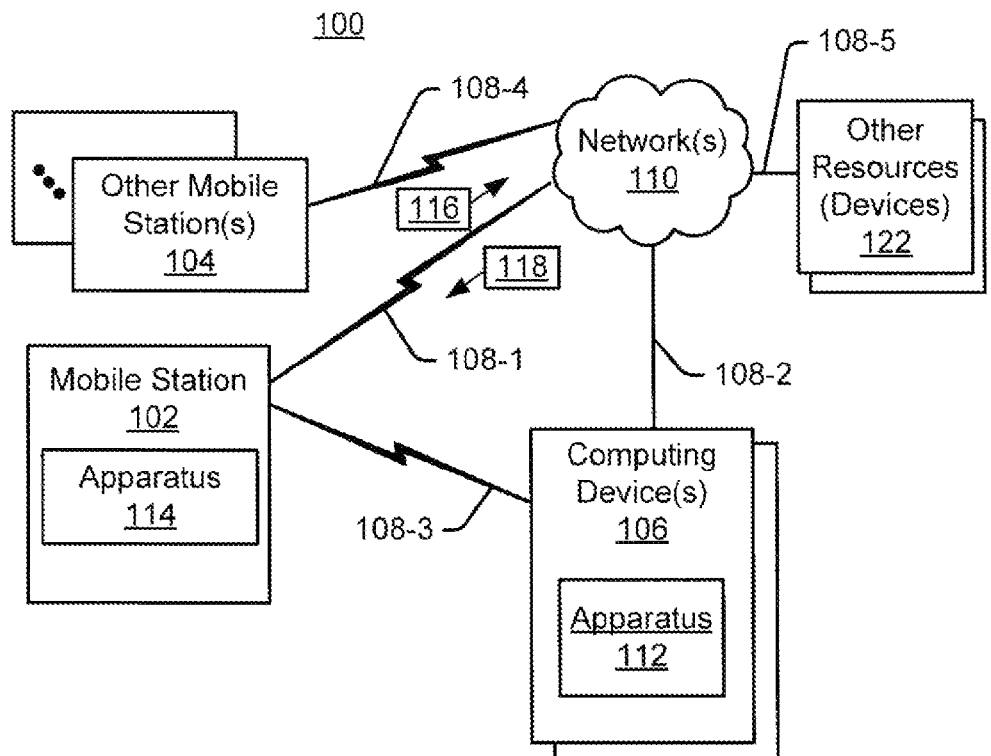
FIG. 1 is a schematic block diagram illustrating an example environment that includes one or more computing devices and a mobile station for use in route navigation, in accordance with an implementation.

Some example techniques are provided herein which may be implemented using various methods and/or apparatuses to allow for delay zone information to be gathered by one or more mobile stations used in route navigation, provided to one or more computing devices and processed in some manner to establish navigation information that may be of use by mobile stations involved in route navigation. For example, in certain instances navigation information may be indicative of an expected delay with regard to at least one known delay zone that may affect a user of the mobile station attempting to adhere to a route and/or associated travel time.

In accordance with an example implementation, a mobile station may implement a method that may assist in identifying potential "delay zones" that a user of the mobile station may encounter when navigating along a suggested route. Here, for example and as described in greater detail below, a mobile station (MS) may establish a route and estimate the user's navigation progress with regard to adhering to the route, e.g., with regard to location and/or time. Accordingly, a mobile station may, for example, identify whether a user appears to be delayed (e.g., waiting for some reason) based, at least in part, on the information associated with such navigation progress. By way of example, a mobile station may identify a wait starting time for at least one delay zone portion of the route and a wait ending time for such delay zone portion of the route. A mobile station may, for example, gather delay zone information associated with at least part of a period of waiting time between the wait start time and the wait ending time. By way of example, such delay zone information may be indicative of estimated location(s) of a mobile station at particular time(s) during the period of waiting time. A mobile station may, for example, selectively transmit at least a portion of such delay zone information to at least one other device.

As described in greater detail herein, delay zone information gathered by a plurality of mobile stations may be used to identify and/or otherwise characterize known delay zones that users may experience. Accordingly, navigation information may, for example, be provided to a mobile station to identify one or more known delay zones in some manner. For example, navigation information may be indicative of a location and one or more expected delay time(s) applicable to a known delay zone. By way of non-limiting example, a known delay zone in an airport complex may relate to a ticketing/baggage counter, a security checkpoint, an inter-terminal train station, a food/shopping court, etc.

With regard to a mobile station that may gather delay zone information, a wait starting time may, for example, be identified based, at least in part, on a parameter associated with the navigation progress and an expected navigation progress threshold value, an estimated location of the mobile station and at least one known delay zone, and/or some combination thereof. A wait ending time may, for example, be identified based, at least in part, on a parameter associated with the navigation progress and an expected navigation progress threshold value, an estimated location of the mobile station and at least one known delay zone, expiration of a waiting period threshold value, an occurrence of a selected action performed using the mobile station subsequent the wait starting time, and/or some combination thereof. Several examples of such techniques are provided in greater detail herein.

The techniques provided herein may, for example, be applied to pedestrian traveled routes or portions thereof, and/or non-pedestrian traveled routes or portions thereof. In estimating a user's navigation progress with regard to a route, a mobile station may, for example, determine an estimated time of arrival at a destination point based, at least in part, on the gathered delay zone information, an expected delay time for at least one known delay zone associated with the route, and/or some combination thereof.

As mentioned, an expected delay time for a known delay zone may, for example, be based, at least in part, on previously gathered delay zone information associated with a plurality of mobile stations. As such, in certain instances, newly gathered delay zone information may or may not correspond to a known delay zone. For example, if newly gathered delay zone information does correspond to a known delay zone, then it may be used in some applicable manner to update or refine navigation information associated with the known delay zone. Conversely, if newly gathered delay zone information does not appear to correspond to a known delay zone, then it may be used in some applicable manner to identify a (potential) new known delay zone, e.g., a decision which may be subsequently supported should other mobile stations gather similar delay zone information.

As described in greater detail herein, navigation information associated with a known delay zone may, for example, be based, at least in part, on gathered delay zone information over relatively longer or shorter (nearer) terms, and/or some combination thereof. By way of non-limiting example, navigation information associated with a known delay zone may be based on delay zone information gathered by a plurality of mobile stations over a long-term of one or more days, weeks, months, or even years. By way of non-limiting example, navigation information associated with a known delay zone may be based on delay zone information gathered by a plurality of mobile stations over a near-term of several minutes or hours, e.g., but less than about a day.

Furthermore, navigation information associated with a known delay zone may, for example, relate to a specific period of time. By way of non-limiting example, a specific period of time may be indicative of, and/or otherwise related in some manner to, one or more dates, days, times of day(s), weeks, holidays, events, etc., and/or some combination thereof. For example, a location, size, shape, and/or other like identifier, or even a presence or absence, of a known delay zone may, for example, change depending on a time or date, event, etc. For example, an expected delay time associated with a known delay zone may be different at different specific periods of time. In a non-limiting example, a security checkpoint at an airport complex may become busier during certain specific periods of time and hence an expected delay time associated therewith may increase accordingly.

With regard to a mobile station that may gather delay zone information, to estimate a user's navigation progress with regard to a route, a mobile station may, for example, determine at least one parameter associated with the navigation progress based, at least in part, on a current expected location of the mobile station, a current estimated location of the mobile station, a current time, and/or some combination thereof. In certain example implementations, at least a portion of gathered delay zone information may be indicative of a period of waiting time, an estimated location of a mobile station at a particular time within a period of waiting time, a sensed movement of a mobile station at a particular time, at least one selected action performed using a mobile station at a particular time, and/or some combination thereof. Several examples of such information are described in greater detail herein.

In certain implementations, a mobile station may, for example, determine a route leading from a starting point associated with the mobile station to a destination position. In certain implementations, a mobile station may, for example, receive assistance from one or more computing devices in determining a route. Indeed, in certain implementations, a mobile station may, for example, receive a route from another device. In certain instances, a route may, for example, be based, at least in part, on at least one map.

In accordance with another aspect, certain techniques herein may be implemented in a mobile station, which may or may not gather delay zone information. Here, for example, a mobile station may obtain at least an expected delay time for at least one known delay zone, wherein the expected delay time may be associated with a specific period of time and based, at least in part, on previously gathered delay zone information associated with at least one other mobile station with regard to at least one known delay zone. Such a mobile station may, for example, establish a route between a starting point and a destination position, wherein by substantially adhering to such route the mobile station is expected to at least enter a known delay zone during a specific period of time. As such, a mobile station may, for example, determine an estimated time of arrival at a destination point or possibly some other point relating to the route based, at least in part, on the expected delay time.

With these example mobile station techniques in mind, in accordance with certain further techniques described herein, at least one computing device may, for example, be implemented to provide navigation information that may be of use to a mobile station. For example, in certain implementations a computing device may obtain delay zone information gathered by at least one mobile station associated with a period of waiting time experienced by the mobile station, e.g., during route navigation. The computing device may, for example, in response to determination that at least a portion of such delay zone information is to be associated with a known delay zone (e.g., previously known or new), determine an expected delay time for the known delay zone based, at least in part, on the delay zone information. As such, the computing device may, for example, provide navigation information for use by at least one other mobile station, wherein the navigation information being based, at least in part, on the expected delay time for such known delay zone.

In certain example implementations, an expected delay time for a known delay zone may be based, at least in part, on a plurality of delay zone information associated with a plurality of mobile stations with regard to the known delay zone gathered over a period of time. In certain example implementations, an expected delay time for a known delay zone may be associated with a specific period of time.

As described in greater detail herein, in certain example implementations a computing device may associate a known delay zone with at least one point of interest. For example, a known delay zone may be associated with a point of interest based on location and/or time. In certain instances, a known delay zone may be associated with a point of interest based on other information associated with an event, a service, a map, a particular user or group of users, an occurrence of a selected action that may have been performed using a mobile station, and/or some combination thereof. Here, for example, a known delay zone may be associated with food court or shopping area, or perhaps even with a specific retailer or service, within an airport complex based on such information.

Attention is drawn now to FIG. 1 which is a schematic block diagram illustrating an example environment 100 that includes one or more computing devices 106 capable of receiving delay zone information 116 gathered by mobile station 102 and/or one or more other mobile stations 104, and/or providing navigation information 118 to mobile station 102 and/or one or more other mobile stations 104, in accordance with an implementation.

Mobile station 102 and/or one or more other mobile stations 104 are each representative of any electronic device that may be reasonably moved about by a user. By way of example but not limitation, such a mobile station may comprise a computing and/or communication device such as a mobile telephone, a smartphone, a lap top computer, a tablet computer, a wearable computer, a personal digital assistant, a navigation device, etc.

Mobile station 102, one or more other mobile stations 104 and computing devices 106 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

Thus, FIG. 1 also illustrates various communication links 108 and one or more networks 110. An apparatus 112 is illustrated within computing device 106, which may, for example, obtain delay zone information 116, establish navigation information 118, and/or perform other processes associated with route navigation involving one or more mobile stations. An apparatus 114 is illustrated within mobile station 102, which may, for example, obtain navigation information 118, gather delay zone information 116, and/or perform other processes associated with route navigation involving mobile station 102.

Additionally in FIG. 1, one or more other resources (devices) 122 are illustrated, which may, for example, support route navigation involving a mobile station in some manner. Here, for example, other resources (devices) 122 may comprise and/or otherwise operatively support location based services, map services, communication services, transactional services, data storage services, etc.

As illustrated, mobile station 102 may transmit certain delay zone information 116 and/or receive navigation information 118, for example, using one or more messages transmitted over a wireless (or wired) communication link 108-1 to network(s) 110 and communication link 108-2 (and/or via a direct wireless (or wired) communication link 108-3) to computing device 106. Similarly, one or more other mobile stations 104 may, for example, transmit certain delay zone information 116 and/or receive navigation information 118, for example, using one or more messages transmitted over a wireless (or wired) communication link 108-4 to network(s) 110 and communication link 108-2 to computing device 106. Also, mobile station 102, other mobile stations 104, and/or computing device 106 may transmit and/or receive information to/from other resources (devices) 122 via network(s) 110 can communication link 108-5, which may comprise wired and/or wireless services.

It should be recognized that one or more communication links 108 shown in FIG. 1, may comprise one or more wireless communication links and/or one or more non-wireless communication links (e.g., with signals transmitted using one or more wires, fibers, etc.), and that such communication links 108 and/or network(s) 110 may also represent various supporting devices and/or technologies associated therewith.

Figure 2:
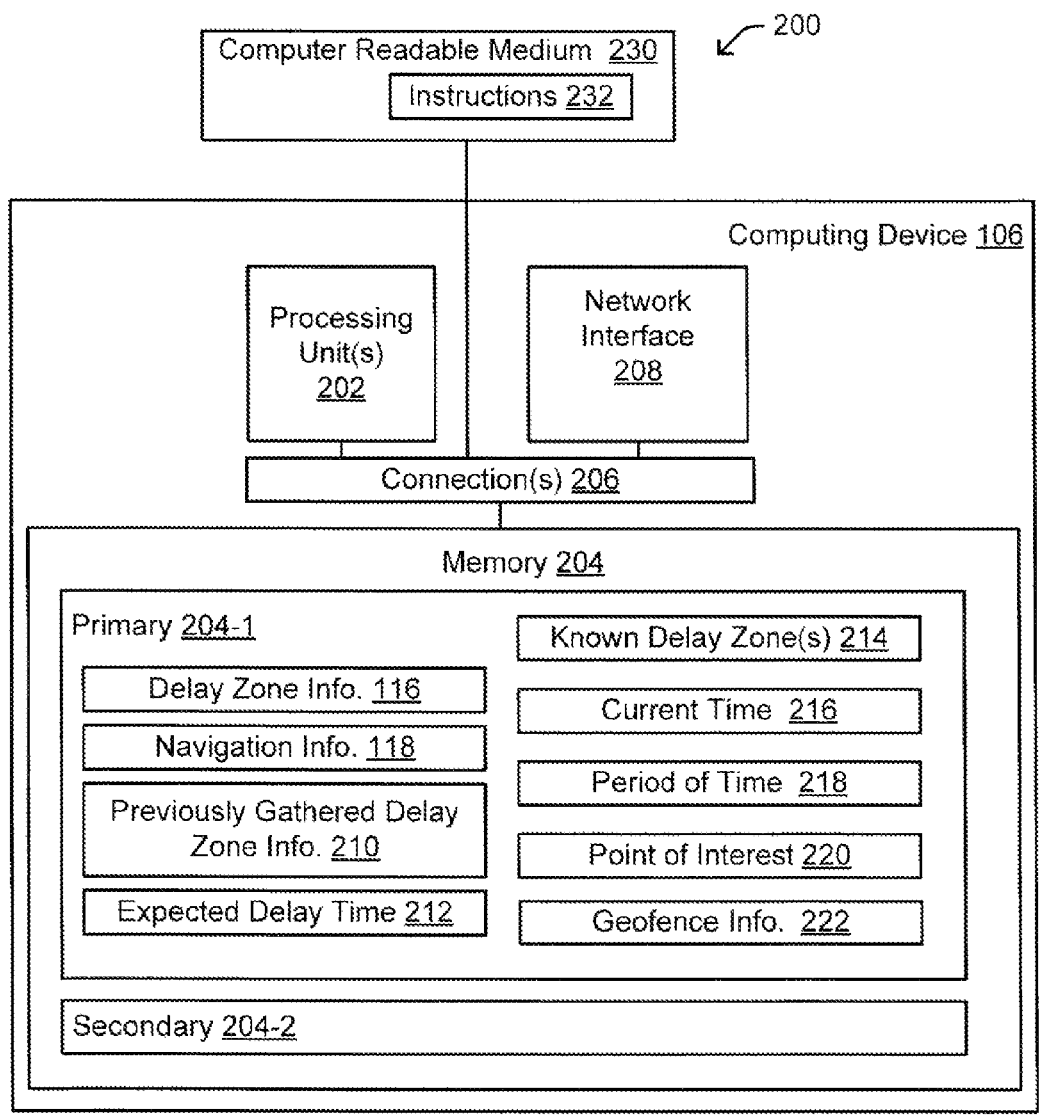
FIG. 2 is a schematic block diagram illustrating certain features of an example computing device capable of providing navigation information for use in route navigation to a mobile station, in accordance with an implementation.

Reference is made next to FIG. 2, which is a schematic block diagram illustrating certain features of computing device 106 capable of providing navigation information 118 to one or more mobile stations.

FIG. 2 shows a specific apparatus 200 in the form of a computing device 106, one or more of which may act, at least in part, as apparatus 112 (FIG. 1) to provide navigation information 118 to one or more mobile stations. In certain example implementations, apparatus 200 may act as an individual server, part of a server farm, part of a cloud computing arrangement, etc. In certain example implementations, apparatus 200 may act as part of a network 110, e.g., at a base station, an access point, etc. In certain example implementations, apparatus 200 may comprise and/or be coupled to one or more other resources (devices) 122 that may be arranged to provide additional information useful in establishing navigation information 118 and/or processing in some manner delay zone information 116.

With this mind, as illustrated in FIG. 2, example computing device 106 may comprise one or more processing units 202, memory 204, connections 206, and a network interface 208. As shown, memory 204 may comprise a primary memory 204-1, and/or a secondary memory 204-2. Here, for example, primary memory 204-1 may store computer-implementable instructions and/or data relating to apparatus 112, which may be executed or otherwise used by processing unit(s) 202.

As illustrated, at certain times primary memory 204-1 may, for example, store information relating to delay zone information 116 gathered by mobile station 102, and/or previously gathered delay zone information 210 that may have been gathered by mobile station 102 and/or one or more other mobile stations 104. For example, delay zone information 116 gathered by mobile station 102 and/or previously gathered delay zone information 210 may be received via network interface 208. For example, navigation information 118 may be generated by processing unit(s) 202 and transmitted to mobile station 102 and/or one or more other mobile stations 104 via network interface 208. Network interface 208 may, for example, comprise one or more wireless transmitters/receivers and/or one or more non-wireless interfaces (e.g., Ethernet, etc.).

As illustrated, at certain times primary memory 204-1 may, for example, store information relating to one or more expected delay time(s) 212, one or more known delay zone(s) 214, a current time 216, one or more periods of time 218, one or more points of interest 220, and/or geofence information 222.

Here, for example, an expected delay time 212 may comprise one or more values and/or functions indicative of one or more expected delay times associated with one or more known delay zones 214, and possibly with regard to one or more periods of time 218 and/or points of interest 220. As described herein, an expected delay time 212 may, for example, be based on delay zone information 116 and/or previously gathered delay zone information 210, and/or other like information (not shown) which may relate to or otherwise affect in some manner route navigation involving a mobile station. Geofence information 222 may, for example, specify a location of one or more geofence regions. For example, geofence information 222 may relate to a map and define boundaries therein which relate to one or more geofences. As described in greater detail herein, in certain example implementations, geofence information 222 may be used to define or determine whether delay zone information 210 may be gathered. For example, geofence information 222 may comprise a threshold geofence distance that relates to a geofence region and which may be compared with a routable distance to determine whether delay zone information 210 should be gathered.

In certain instances, navigation information 118 may be determined in advance (e.g., established or updated at certain times), in response to a request and/or upon obtaining gathered delay zone information (e.g., from a mobile station or other resource), in some dynamic manner (e.g., in near real-time, etc.), and/or some combination thereof.

Information indicative of one or more known delay zone(s) 214 may, for example, identify a location of a known delay zone in some manner. For example, a location of a known delay zone may be identified using certain geographical coordinates, a unique identifier, shape and/or size parameters, and/or the like, or any combination thereof. By way of non-limiting example, a location of a known delay zone may identify a point, a portion, a feature, and/or some combination thereof and/or other like information as may be provided for or otherwise identifiable via one or more maps that may be used for route navigation involving a mobile station.

Information indicative of a current time 216 may, for example, relate to a local clock or other like timer (not shown) associated with computing device 106 and/or apparatus 112. In certain instances, for example, current time 216 may relate to a universal time and/or some time that may also be operable understood by a mobile station involved in route navigation. Thus, in certain instances, current time 216 may be simultaneously available to and/or determinable by a mobile station. In certain instances, for example, network(s) 110 may provide, synchronize, and/or otherwise indicate current time 216 in some manner to devices coupled thereto.

Information indicative of one or more periods of time 218 may, for example, identify when a known delay zone 214 may be present, when an expected delay time 212 may be applicable, when a point of interest 220 may be present, and/or some combination thereof. For example, as mentioned, a specific period of time may be indicative and/or otherwise related in some manner to one or more dates, days, times of day(s), weeks, holidays, events, etc., and/or some combination thereof.

Information indicative of one or more points of interest 220 may, for example, identify a tangible feature that may be associated with one or more known delay zones. For example, a specific point of interest 220 may identify a ticketing/baggage check-in station and/or security checkpoint within an airport complex, and which may be associated with a known delay zone. For example, a specific point of interest 220 may identify a coffee stand, bookstore, and/or other retail shop or service within an airport complex, and which may be associated with a known delay zone. In certain other example instances, information indicative of one or more points of interest 220 may identify a less tangible or possibly transitory event that may be associated with one or more known delay zones. For example, a specific point of interest 220 may identify a crowd or queue of people gathered within an airport terminal to listen to a choral group perform.

As mentioned, a known delay zone 214 may be associated with one or more points of interest 220. For example, location information for a known delay zone 214 may be matched to location information of a point of interest 220. For example, a known delay zone 214 may be associated with a point of interest 220 based, at least in part, on user input (e.g., from mobile stations, at computing device 106, etc.), map information, other information (e.g., available from other resources 122), and/or some combination thereof.

In a particularly interesting example, apparatus 112, apparatus 114, and/or other resources 122, alone or combined may identify a known delay zone 214, point of interest 220, and/or associate such, based on one or more other actions that a mobile station may perform. Here, in this non-limiting example, let us assume that mobile station 102 may be delayed in adhering to a route because the user has stopped at a retail shop within an airport complex to purchase a gift before proceeding to the departure gate (e.g., the route destination point). Let us assume further that such shopping excursion leads to a period of waiting time during which the mobile station gathers delay zone information 116 and that the user eventually purchases a gift using a credit card. Assuming further that all privacy regulations and other concerns are satisfied, apparatus 112 and/or other resource may consider the resulting delay zone information gathered by mobile station 102 and point of purchase and/or other like retail store information to associate a known delay zone 214 (e.g., previously known or newly known) with a point of interest 220 (e.g., the particular retail shop, or group of shops, etc.). Conversely, apparatus 112 and/or other resource may consider the resulting delay zone information gathered by mobile station 102 and point of purchase and/or other like retail store information to not associate the gathered delay zone information 116 with a known delay zone 214, e.g., should the delay be deemed to be particular to that user and likely not of a type of delay that other users might necessarily experience.

Computing device 106 may, for example, take the form of a specific computing device comprising one or more processing units 202 that perform data processing (e.g., in accordance with all or part of the techniques provided herein) coupled to memory 204 via one or more connections 206. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, a non-transitory computer readable medium 230. As illustrated, memory 204 and/or non-transitory computer readable medium 230 may comprise computer-implementable instructions 232 associated with data processing (e.g., in accordance with the techniques provided herein).

Figure 3:
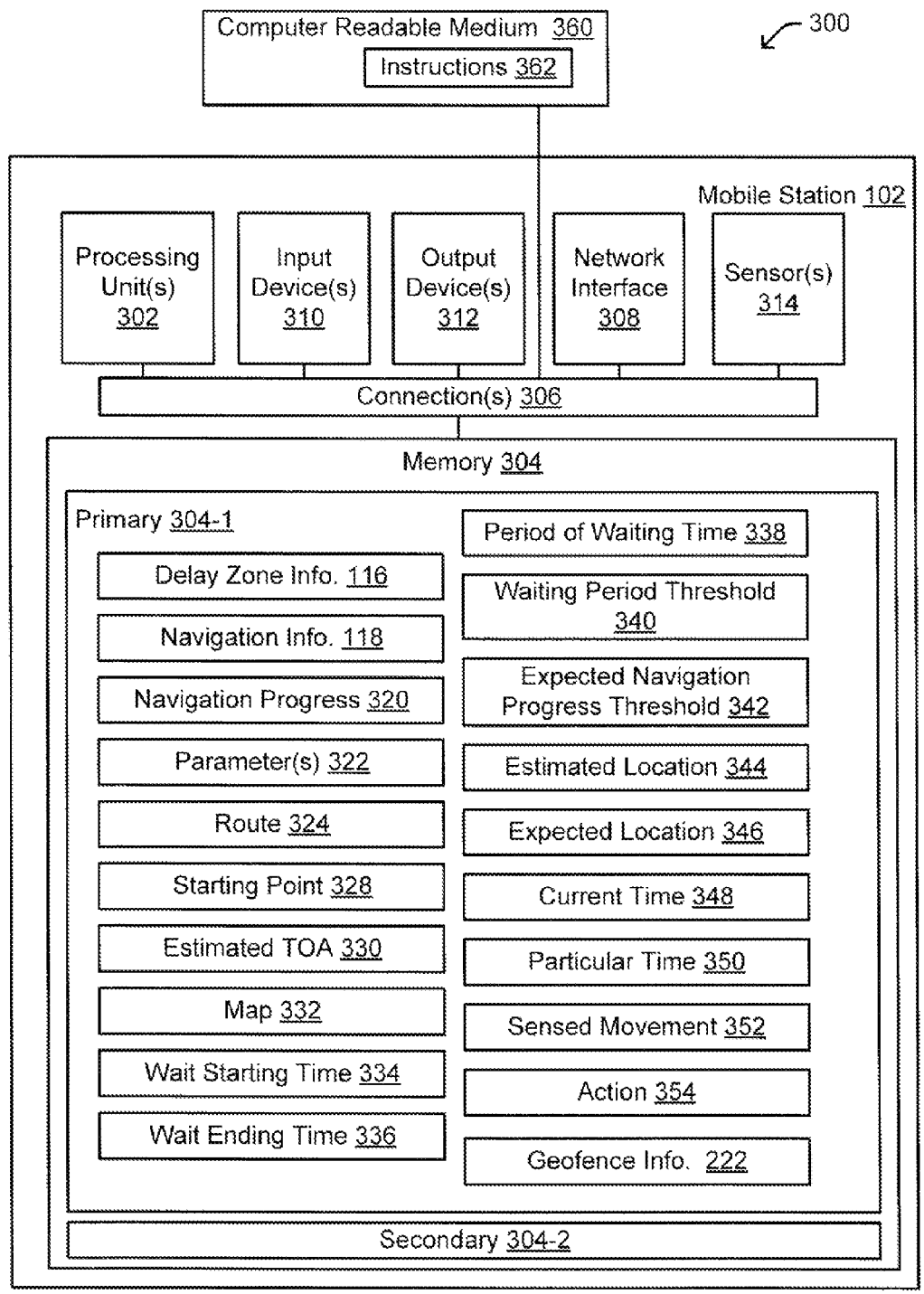
FIG. 3 is a schematic block diagram illustrating certain features of an example mobile station for use in route navigation, in accordance with an implementation.

Reference is made next to FIG. 3, which is a schematic block diagram illustrating certain features of mobile station 102, for example as in FIG. 1, for use in route navigation and which is capable of gathering and providing delay zone information 116 to, and/or receiving navigation information 118 from, one or more computing devices 106. While illustrated as mobile station 102, such or similar arrangement may also represent one or more mobile stations 104 (FIG. 1).

FIG. 3 shows a specific apparatus 300 in the form of a mobile station 102 which may act, at least in part, as apparatus 114 (FIG. 1) to selectively gather and provide delay zone information 116 to one or more computing devices 106, and/or receive navigation information 118 from one or more computing devices 106. In certain instances, mobile station 102 may act, at least in part, as apparatus 114 to access one or more other resources (devices) 122 (FIG. 1). In certain example implementations, apparatus 300 may take the form of any electronic device that may be reasonably moved about by a user.

With this mind, as illustrated in FIG. 3, example mobile station 102 may comprise one or more processing units 302, memory 304, connections 306, a network interface 308, one or more user input devices 310, one or more user output devices 312, and one or more sensors 314. As shown, memory 304 may comprise a primary memory 304-1, and/or a secondary memory 304-2. Here, for example, primary memory 304-1 is illustrated as storing information relating to apparatus 114, which may be executed or used by processing unit(s) 302. For example, apparatus 114 may be executed by processing unit(s) 302 to establish delay zone information 116 and initiate transmission of such to one or more computing devices 106 via network interface 308. For example, apparatus 114 may be executed by processing unit(s) 302 to obtain navigation information 118 from one or more computing devices 106 via network interface 308.

As illustrated, mobile station 102 may take the form of a specific computing device comprising one or more processing units 302 to perform data processing (e.g., in accordance with all or part of the techniques provided herein) coupled to memory 304 via one or more connections 306. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile station 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, non-transitory computer readable medium 360. As illustrated, memory 304 and/or non-transitory computer readable medium 360 may comprise computer-implementable instructions 362 associated with data processing (e.g., in accordance with the techniques provided herein).

In certain example implementations, as illustrated, mobile station 102 may further comprise one or more user input devices 310 (e.g., keyboard, touch screen, etc.) and/or one or more user output devices 312 (e.g., a display, a projector, a speaker, etc.). Hence, for example, location based service, route, map, and/or other like information may be presented to the user via some form of user output. Also, user input may be received which relates to location based services or other capabilities.

Although not illustrated, it should be understood that mobile station 102 may be enabled to perform a variety of tasks, some or many of which may be unrelated to location based services and/or other like position estimation capabilities. Mobile station 102 may comprise a GPS or other like global navigation satellite system (GNSS) or local navigation capability receiver (not shown) that may be used to an estimated location 344, for example. Additionally, it should be understood that apparatus 114 may be representative of one or more capabilities associated with location based services and/or other like position estimation.

As illustrated in the example in FIG. 3, at times, memory 304 may store information indicative of delay zone information 116, navigation information 118, a navigation progress 320, one or more parameters 322, a route 324, a starting point 328, an estimated time of arrival (TOA) 330, one or more maps 332, a wait starting time 334, a wait ending time 336, a period of waiting time 338, a waiting period threshold 340, an expected navigation progress threshold 342, an estimated location 344, an expected location 346, a current time 348, a particular time 350, a sensed movement 352, an action 354, and/or geofence information 222.

Delay zone information 116 may, for example, be indicative of one or more estimated locations 344 of mobile station 102 at particular times 350 during a period of waiting time 338, which may occur between wait starting time 334 and wait ending time 336. Delay zone information 116 may also be indicative of a sensed movement 352 of a mobile station (e.g., sensed inertial movement or lack thereof based on sensor(s) 314), at least one selected action 354 performed using a mobile station (e.g., a user input, a call, a point of sale, an Internet connection, etc.), and/or some combination thereof, which may identify a location of a known delay zone (e.g., previously known or newly known) in some manner.

As previously mentioned, information indicative of navigation information 118 navigation information may be indicative of a location of, and one or more expected delay time(s) applicable to, a known delay zone, and may comprise one or more values and/or functions indicative of one or more expected delay times associated with one or more known delay zones 214, and possibly with regard to one or more periods of time 218 and/or points of interest 220.

Information indicative of navigation progress 320 may, for example, relate to some measurement regarding adherence to route 324. Such adherence may consider, for example, time and location relating to an expected navigation of a route and whether the user may be fast, slow, or on-time based on a comparison of an estimated location 344 and an expected location 346, e.g., at current time 348. Here, for example, navigation progress 320 may indicate such adherence via one or more parameters 322 that may be compared to one or more expected navigation progress threshold (values) 342. Parameter(s) 322 and corresponding expected navigation progress threshold(s) 342 may relate, therefore, to time and/or distance measurements and/or other like related values. Thus, for example, a wait starting time 334 may be identified based, at least in part, on a parameter 322 failing to satisfy in some manner a corresponding expected navigation progress threshold 342. For example, parameter 322 may relate to an estimated velocity and/or estimated location, and expected navigation progress threshold 342 may relate to a corresponding expected velocity and/or expected location (e.g., with regard to the route and a given time or time period). For example, parameter 322 may relate to an estimated TOA 330 and expected navigation progress threshold 342 may relate to a corresponding expected, desired, and/or latest acceptable time of arrival.

An estimated location 344 may be based on one or more signals and/or information associated with various location based services, GNSS, local navigation services, networks, etc. An expected location 346 may, for example, be based on a certain time (e.g., current time, etc.), an estimated distance to travel along a route or portion thereof and one or more estimated rates of travel (e.g., depending on the mode of transport). Such expected location may also take into consideration navigation information 118, which may indicate expected delay times for one or more known delay zones that may affect route 324.

An expected navigation progress threshold 342 may, for example, be preset and static and/or dynamically set/maintained based on various factors, such as, e.g., user preferences, learned user information, navigation information 118, delay zone information 116, map 332, etc.

These are but a few non-limiting examples of techniques via which apparatus 114 may determine navigation progress 320, and/or determine whether to start and/or stop gathering delay zone information 116.

Information indicative of route 324 may, for example, relate to map 332 and various features and/or coordinates, and the like as used therein. Various techniques are known for determining a route from starting point 328 to one or more intermediate positions and on to a destination position, for example, via a shortest, fasted, safest, etc., path or paths. Information indicative of estimated TOA 330 may, for example, be updated from time to time, e.g., based on navigation progress 320 or other like information.

Information indicative of wait starting time 334 may, for example, relate to a location and timestamp, a parameter 322, expected navigation progress threshold 342, and/or other information associated with identifying such wait starting time. Similarly, information indicative of wait ending time 336 may, for example, relate to a location and timestamp, parameter 322, waiting period threshold 340, expected navigation progress threshold 342, and/or other information associated with identifying such wait ending time. Information indicative of period of waiting time 338 may, for example, relate to a time period, wait starting time 334, wait ending time 334, parameter(s) 322 and/or other information associated with identifying such period of waiting time.

Information indicative of current time 348 may, for example, be the same or similar to current time 216 (FIG. 2). Thus, for example, current time 348 may be used to create timestamps or otherwise record a time or time period, and may relate to a local clock or other like timer associated with mobile station 102 and/or apparatus 114. In certain instances, for example, current time 348 may relate to a universal time and/or some time that may also be operable understood by computing device 106 involved in route navigation. In certain instances, for example, network(s) 110 may provide, synchronize, and/or otherwise indicate current time 216 and/or 348 in some manner to devices coupled thereto.

Information indicative of sensed movement 352 may, for example, relate to one or more sensors 314. Sensor(s) 314 may, for example, comprise one or more accelerometers, a gyroscope, a magnetometer, and/or other like inertial and/or environmental sensor, and/or a combination thereof. Thus, for example, sensed movement 352 may indicate that mobile station 102 may be moving or stationary, which may be considered by apparatus 114 and/or apparatus 112, e.g., to establish delay zone information 116 and/or navigation information 118. Sensed movement 352 may, for example, be used to estimate a velocity of mobile station 102, and/or possibly identify a mode of transportation. Here, for example, a user may be waiting for a train and hence not moving about significantly, but, once onboard the train, an accelerometer may record a significant acceleration as the train begins moving.

Figure 4A:
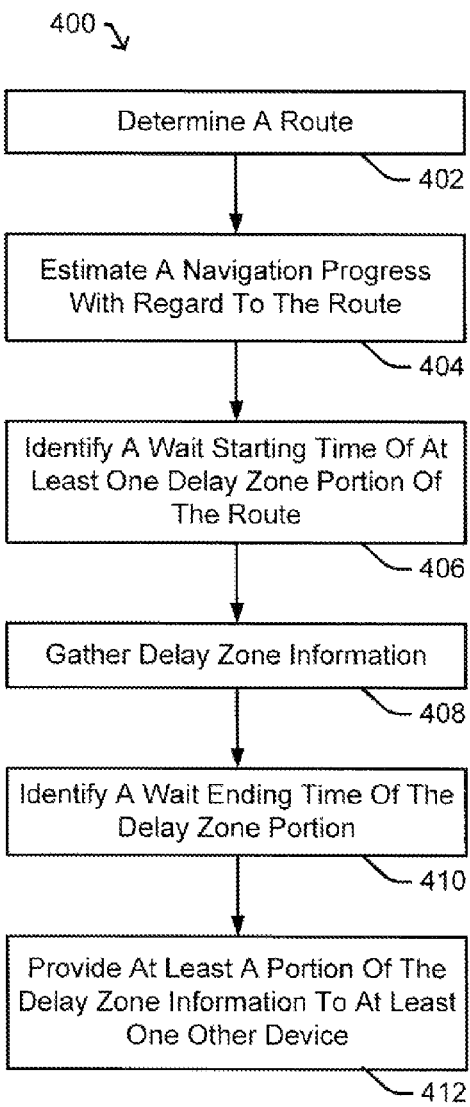
FIG. 4A is a flow diagram illustrating certain features of an example process for use in a mobile station to gather delay zone information that may be of use in route navigation, in accordance with an implementation.

Reference is made next to FIG. 4A, which is a flow diagram illustrating certain features of an example process 400 for use in a mobile station 102 (or 104) to gather delay zone information 116 that may be of use in route navigation, in accordance with an implementation. By way of example, in certain implementations, all or part of process 400 may be implemented via apparatus 114 (FIG. 1).

At block 402, a route 324 (FIG. 3) or portion thereof may be determined. Here, for example, a mobile station may determine such route independently and/or with assistance, or simply receive such route from one or more other/computing devices. Here, for example, route 324 may relate to one or more maps and/or other like information that may be presented in some manner to a user of the mobile station.

At block 404, a navigation progress 320 or portion thereof may be estimated or otherwise determined with regard to route 324 or portion thereof. Navigation progress 320 (FIG. 3) may, for example, be continuously, periodically, and/or otherwise selectively updated.

At block 406, a wait starting time of at least one delay zone portion of the route may be identified, e.g., based, at least in part on navigation progress 320. By way of example, in certain instances a wait starting time of at least one delay zone portion of the route may be identified based, at least in part, on a parameter associated with navigation progress 320, an expected navigation progress threshold value, information relating to an estimated location of the mobile station and at least one known delay zone, and/or some combination thereof.

In certain example implementations, a delay zone may be identified based, at least in part, on one or more features identifiable in a map, e.g., within navigation information. Here, for example, a grid layout process or other like known process may be used to identify certain features (e.g., doors, elevators, stairs, security points, etc.) associated with a route and/or which may relate to or present a delay zone. Here, for example, if a route or portion thereof may not navigationally continuous (e.g., there may be closing doors, etc.), then such may be defined as a delay zones. Such delay zone barriers may be pre-identified (e.g., manually in a map), and/or identified based thereon by mobile station 102 and/or computing device 106 also be manually indicated on the map.

At block 408, delay zone information 116 may be gathered. For example, delay zone information 116 may be continuously, periodically, and/or otherwise selectively gathered.

At block 410, a wait ending time of the delay zone portion of the route may be identified, e.g., based, at least in part on navigation progress 320. By way of example, in certain instances a wait ending time of the delay zone portion of the route may be identified based, at least in part, on a parameter associated with navigation progress 320 and/or an expected navigation progress threshold value, information relating to an estimated location of said mobile station and at least one known delay zone, expiration of a waiting period threshold value, an occurrence of a selected action performed using the mobile station, and/or some combination thereof.

At block 412, at least a portion of delay zone information 116 may be transmitted or otherwise provided to at least one other computing device. For example, in certain instances, such delay zone information 116 may be transmitted during a period of waiting time, and/or at some later time.

Figure 4B:
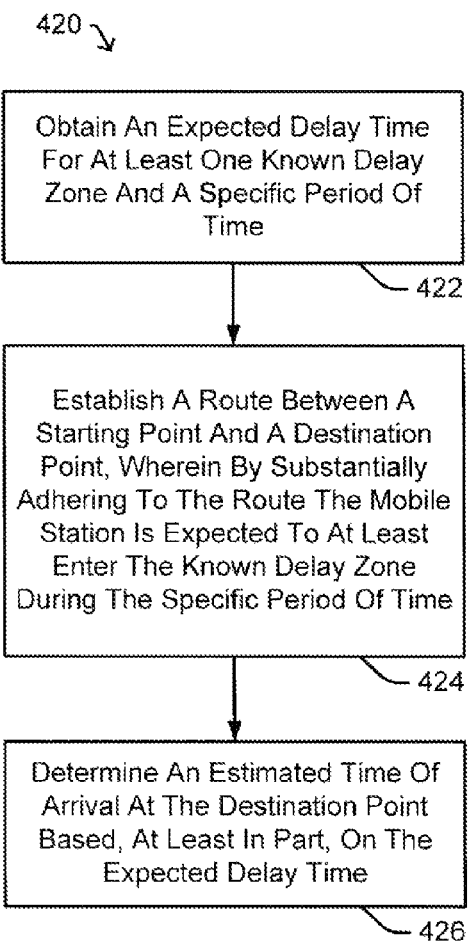
FIG. 4B is a flow diagram illustrating certain features of an example process for use in a mobile station to obtain navigation information that may be of use in route navigation, in accordance with an implementation.

FIG. 4B is a flow diagram illustrating certain features of an example process 420 for use in a mobile station 102 (or 104) to obtain navigation information 118 that may be of use in route navigation, in accordance with an implementation.

At block 422, an expected delay time for at least one known delay zone may be obtained, e.g., via navigation information 118 (FIG. 1). Here, for example, such expected delay time may be associated with a specific period of time and based, at least in part, on previously gathered delay zone information associated with at least one other mobile station with regard to a known delay zone.

At block 424, a route 324 (FIG. 3) between a starting point and a destination point may be established. Here, by substantially adhering to such route the user of a mobile station is expected to at least enter a known delay zone during a specific period of time.

Accordingly, at block 426, an estimated time of arrival at the destination point may be determined based, at least in part, on the expected delay time relating to the known delay zone during the specific period of time.

It should be recognized that an apparatus 114 (FIG. 1) may implement one or both of processes 400 and 420, and/or otherwise combine these processes together.

Figure 5:
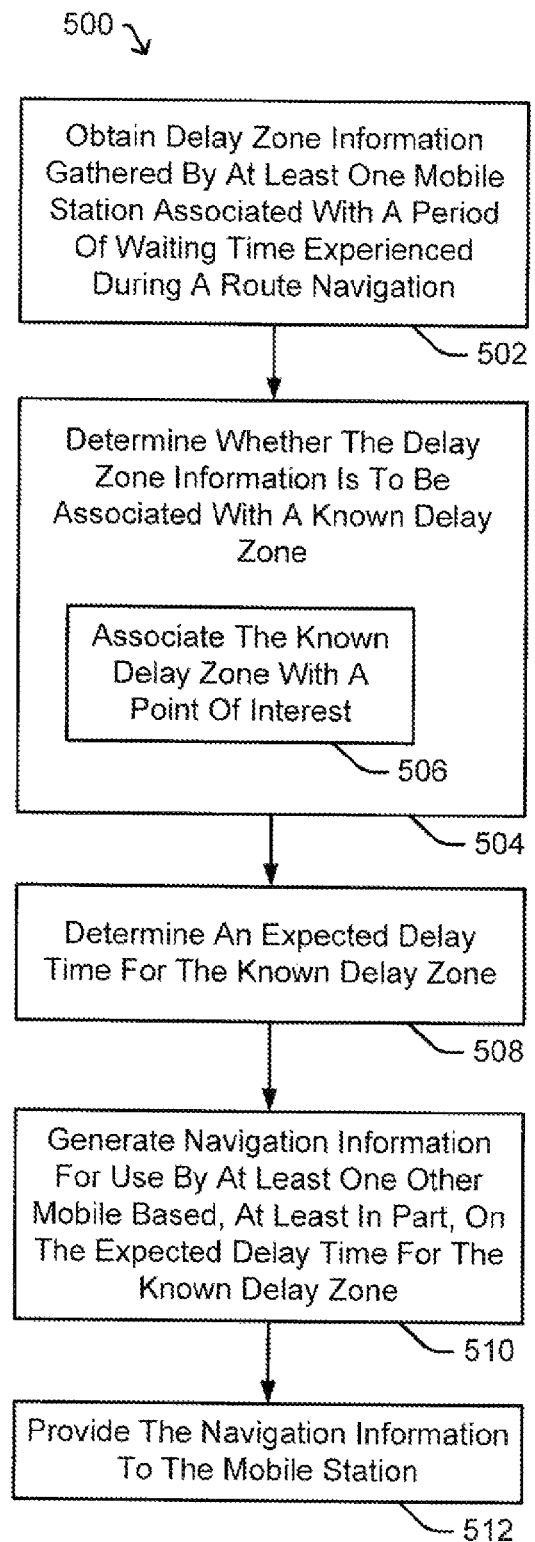
FIG. 5 is a flow diagram illustrating certain features of an example process for use in at least one computing device to establish navigation information that may be of use in route navigation involving a mobile station, in accordance with an implementation.

FIG. 5 is a flow diagram illustrating certain features of an example process 500 for use in at least one computing device 106 to establish navigation information 118 (FIG. 1) that may be of use in route navigation involving a mobile station, in accordance with an implementation.

At block 502, delay zone information 116 may be obtained. For example, delay zone information gathered by at least one mobile station associated with a period of waiting time experienced (e.g., during a route navigation) may be obtained via one or more communication links by apparatus 112 (FIG. 1). In an example implementation, at least a portion of such delay zone information may be indicative of a period of waiting time, an estimated location of a mobile station at a particular time within a period of waiting time, a sensed movement of at least one mobile station at a particular time, at least one selected action performed using at least one mobile station mobile station at a particular time, and/or some combination thereof.

At block 504, it may be determined whether the obtained delay zone information is to be associated with a known delay zone, e.g., either a previously known delay zone or a newly known delay zone (e.g., hereby identified). In certain instances, at block 506, such known delay zone may also be associated with one or more points of interest.

At block 508, an expected delay time for such known delay zone may be determined. For example, in certain instances such expected delay time for a known delay zone may be based, at least in part, on a plurality of delay zone information associated with a plurality of mobile stations with regard to the known delay zone over a period of time. In certain example implementations, an expected delay time for a known delay zone may be associated with a specific period of time.

At block 510, navigation information may be generated based, at least in part, on the expected delay time for the known delay zone. Here, for example, such navigation information may be used by at least one other mobile involved in route navigation.

Hence, for example at block 512, all or part of such navigation information may be transmitted or otherwise provided to one or more mobile stations.

Figure 6:
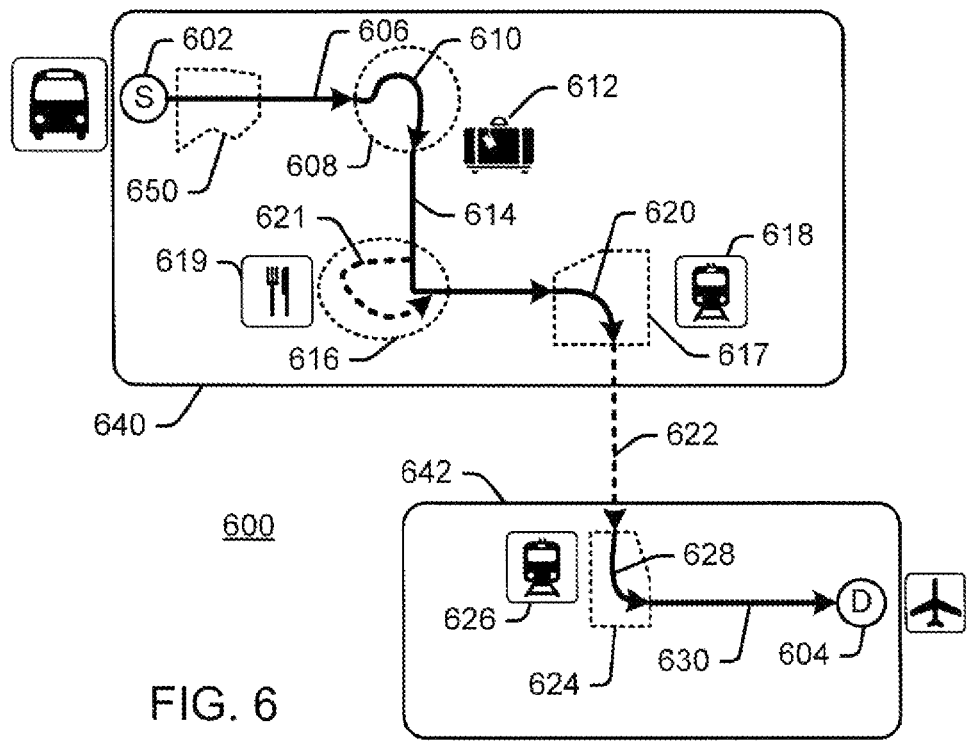
FIG. 6 is an illustrative diagram depicting certain features of an example route that may be navigated by a user having a mobile station, in accordance with an implementation.

Attention is drawn next to FIG. 6, which is an illustrative diagram depicting certain features of an example route that may be navigated by a user having a mobile station, in accordance with an implementation.

By way of non-limiting example, FIG. 6 depicts a fictional airport complex 600, wherein a route is shown leading from starting point 602 in building 640 to destination point 604 in building 642. Thus, as illustrated by the bus stop icon, starting point 602 may be associated with a passenger loading and unloading area; and, as illustrated by the airliner icon, destination point 604 may be associated with a passenger terminal.

In this example, the route comprises pedestrian travel mode portions 606, 610, 614, 620, 628 and 630, and non-pedestrian travel mode portion 622 (shown in dashed line form) via a train between a train depot (icon 618) in building 640 and a train depot (icon 626) in building 642.

This example route enters several known delay zones 608, 617 and 624. For example, known delay zone 608 may be associated with a ticket/baggage check-in counter (which may be a point of interest) as illustrated by icon 612. Portion 610 of the route enters and exits known delay zone 608. Known delay zone 617 may be associated with a train depot (which may be a point of interest) as illustrated by icon 618. Portion 620 at least enters known delay zone 617. Known delay zone 624 may be associated with another train depot (which again may be a point of interest) as illustrated by icon 626. Portion 628 at least exits known delay zone 624.

In accordance with certain example implementations, navigation information may be provided to a mobile station which considers and/or is otherwise indicative of an expected delay time for portions 610, 620 and 628 which relate to known delay zones 608, 617 and 624, respectively.

As such, an estimated total time of travel may be based, at least in part, by adding the applicable expected delay times for portions 610, 620 and 628 to the expected travel times associated with the other remaining portions 606, 614, 622 and 630. Here, for example, the expected travel times associated with portions 606, 614, 622 and 630 may be determined based on applicable distances and rates of travel for each portion of the route. The resulting total time of travel may, for example, be added to a starting time associated with starting point 602 to estimate a time of arrival a destination point 604.

It should be noted, that in certain example implementations, one may combine known delay zones together to form a single known delay zone. For example, known delay zones 617 and 624 relating to train depots (icons 618 and 626), respectively, may be combined together into a single known delay zone having an expected delay time that is based on the combined expected delay times for portions 620, 622 and 628. As such, with knowledge of such a known delay zone, a mobile station may gather delay zone information associated with a waiting period of time associated with a potential delay at train depot (icon 618), a delay whilst aboard the train, and a potential delay at train depot (icon 626). Indeed, in a arrangement such as this, a mobile station may verify that it was actually traversing such a known (combined) delay zone by detecting the likely significant resulting change in location and/or a sensed motion (e.g., train's acceleration).

As depicted in FIG. 6, there may be a point of interest (represented here by food court icon 619) that may lead a user to slow down and/or deviate from the route (as illustrated by dashed line portion 621) in some manner and which introduces a delay which may be indicated via navigation progress 320 (FIG. 3). Thus, for example in accordance with process 400 (FIG. 4A), a mobile station may decide to gather delay zone information. Such delay zone information may, for example in accordance with process 500 (FIG. 5), be used to consider whether there may be a known delay zone 616 (e.g., newly identified in this example).

In certain other example implementations, a known delay zone may be associated with one or more geofence regions 650, which may be specified to apparatus 114 (e.g., via geofence information 322, and/or otherwise within a route, map, navigation information, etc). Thus, for example, mobile station 102 may determine when it is within such a geofence region 650 (e.g., based on geofence information 222, navigation progress 320, estimated location 344, map 332, etc.) and gather applicable delay zone information relating to such geofence region 650.

As represented as having a polygon shape in FIG. 6, example geofence region 650 is intended to define a region of map 332 wherein there may be one or more routes to be taken, one or more of which may have a routable distance that is less than some threshold geofence distance (e.g., twenty meters, etc.) from some specified point (e.g., an entry point, an exit point, a center point, etc.) relating to geofence region 650. In the illustrated example in FIG. 6, geofence region 650 comprises a region near starting point 602, which may, for example, relate to an entryway of building 640. Here, for example, while not shown it may be that a pedestrian's possible movement within geofence 650 may take one of several routes, one or more of which may relate to navigating around various obstacles, etc. With this in mind, the representative polygon shown in FIG. 6 as representing geofence 650 is intended to illustrate that a pedestrian traveling the same routing distance along different routes from a starting point may or may not end up located the same linear distance from the starting point.

A geofence region and/or threshold geofence distance may, for example, be specified via geofence information 222. All or part of geofence information 222 may, for example, be determined by either computing device 106 and/or mobile station 102.

In certain example implementations, should a route lead into or trough geofence region 650, a geofence may be "triggered" in which mobile station 102 may gather applicable delay zone information relating to geofence region 650. For example, a geofence may be triggered by having a route which enters into a specified geofence while leading from a specific point to a point of interest. In certain example implementations, a geofence may be triggered by having a route which has a routable distance that is less than a threshold geofence distance. In certain example implementations, a geofence may be triggered across floors in a building, e.g., should there exist a route to a point of interest or some other point having a routable distance that is less than a threshold geofence distance. Accordingly, in certain example implementations, mobile station 102 may determine whether a routable distance is less than a threshold geofence distance. Again, as mentioned, such a routable distance in certain example implementations should not contradict any logical barriers to the movement of the mobile station.

As illustrated in the various examples herein, the techniques described and shown may employ location tagging, time stamping and analysis (e.g., statistical analysis, heuristics, etc.) to estimate expected delay times of a mobile station within a known delay zone. Such delay estimates may, for example, influence a routing cost in terms of estimated time for routes that go near certain points of interest which may be associated with a known delay zone.

By way of non-limiting example, as previously mentioned in certain example implementations an expected delay time may be based, at least in part, on delay zone information gathered over a relatively long-term (e.g., one or more days) and/or a relatively near-term (e.g., minutes or hours less than about a day) by a plurality of mobile stations with regard to a known delay zone.

Thus, for example, in an implementation for a given time period (e.g., a 30 minute period) one may aggregate applicable delay zone information (e.g., delay time values $T_k$) to determine a mean or median delay. As such, one may determine $T_{day} = \Sigma T_k / N_{day}$, where $N_{day}$ is the number of samples for the time of day and $T_{day}$ is the delay estimate for that time of day.

One may then use a filter or the like to take into consideration certain current (near-term) estimates as well as certain historical (long-term) information. Thus, for example, $T_{current} = \Sigma T_k / N_{current}$, where $N_{current}$ is the number of samples in the last 30 minutes and $T_k$ are the observed times for these samples. Hence, as an example, a final expected delay time estimate may be equal to $(\alpha * T_{day} + (1-\alpha) T_{current})$, where $\alpha$ is a weighting factor.

In certain other example implementations, apparatus 112 may employ queue size estimation techniques along with delay estimates in determine a near-term (near real-time delay). For example, if a plurality of mobile stations are currently within a known delay zone and gathering delay zone information, then apparatus 112 may consider such "fresh" near-term information as possibly being more accurate of a current expected delay time. Thus, such information may be heavily weighted in determining an expected delay time.

In certain example implementations, certain delay zone information may be pruned from a set of long-term and/or near-term samples. For example, apparatus 112 and/or 114 may skip or remove certain gathered delay information which may be deemed erroneous (e.g., based on statistics, threshold values, etc.). For example, if a mean wait time for a known delay zone is six minutes and one mobile station experiences a ninety minute delay, such information may be pruned in some manner from the set. For example, such an extended delay time may occur in an airport complex should a user arrive early and decide to sit and read a book while within a known delay zone.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A non-transitory computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

In an example implementation, any machine-readable medium tangibly embodying instructions may be used in implementing the methodologies described herein. For example, software codes may be stored in a memory and executed by one or more processing units. In certain instances, memory may be implemented within a processing unit(s) or external to the processing unit. As used herein the term "memory" refers to any type of long term, short term, volatile, nonvolatile, or other memory and is not to be limited to any particular type of memory or number of memories, or type of media upon which memory is stored. Examples include non-tangible computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer or other like machine; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with a mobile station:
estimating, by one or more processors of said mobile station, a navigation progress of said mobile station as said mobile station traverses a route, wherein said route is generated by said mobile station for pedestrian navigation along at least a section of said route;
determining, by said one or more processors, that said mobile station is delayed from progressing along said at least a section of said route based on a parameter associated with said navigation progress and a corresponding expected navigation progress threshold relative to pedestrian travel along said at least a section of said route;
identifying, by said one or more processors, a wait starting time of at least one delay zone portion of said at least a section of said route, said identifying said wait starting time based, at least in part, on said determining that said mobile station is delayed from progressing along said at least a section of said route;
determining, by said one or more processors, that said mobile station is no longer delayed from progressing along said at least a section of said route;
identifying, by said one or more processors, a wait ending time of said at least one delay zone portion of said at least a section of said route based, at least in part, on said determining that said mobile station is no longer delayed from progressing along said at least a section of said route;
based on said wait starting time and said wait ending time, determining, by said one or more processors, delay zone information associated with at least part of a period of waiting time between said wait starting time and said wait ending time, said delay zone information indicating at least a location of said at least one delay zone determined, by said one or more processors, based on a location of said mobile station at a particular time between said wait starting time and said wait ending time;
and
selectively transmitting at least a portion of said delay zone information, from said mobile station, to a device for use in a pedestrian navigation operation for pedestrian travel along said at least a section of said route using said device.

2. The method as recited in claim 1, wherein said determining that said mobile station is no longer delayed from progressing along said route is based, at least in part, on at least one of:
said parameter associated with said navigation progress and said corresponding expected navigation progress threshold value; or
an estimated location of said mobile station and at least one known delay zone.

3. The method as recited in claim 1, wherein said determining that said mobile station is no longer delayed from progressing along said route is based, at least in part, on at least one of:
said parameter associated with said navigation progress and said corresponding expected navigation progress threshold value;
an estimated location of said mobile station and at least one known delay zone;
expiration of a waiting period threshold value; or
an occurrence of a selected action performed using said mobile station subsequent to said wait starting time.

4. The method as recited in claim 1, wherein estimating said navigation progress of said mobile station as said mobile station traverses said route comprises:
determining an estimated time of arrival at a destination point based, at least in part, on at least one of: said delay zone information; or an expected delay time for at least one known delay zone associated with said route.

5. The method as recited in claim 4, wherein said expected delay time for said at least one known delay zone is based, at least in part, on previously gathered delay zone information associated with a plurality of mobile stations with regard to said at least one known delay zone.

6. The method as recited in claim 1, wherein said portion of said delay zone information further corresponds to at least one known delay zone.

7. The method as recited in claim 1, wherein estimating said navigation progress of said mobile station as said mobile station traverses said route comprises:
determining said parameter associated with said navigation progress based, at least in part, on at least one of: a current expected location of said mobile station; a current estimated location of said mobile station; or a current time.

8. The method as recited in claim 1, wherein said portion of said delay zone information associated with said period of waiting time is indicative at least one of:
said period of waiting time;
an estimated location of said mobile station at a particular time within said period of waiting time;
a sensed movement of said mobile station at said particular time;
at least one selected action performed using said mobile station at said particular time; or
at least one geofence region.

9. The method as recited in claim 1, and further comprising, with said mobile station:
determining said route leading from a starting point associated with said mobile station to a destination point based, at least in part, on at least one map.

10. The method as recited in claim 1, wherein identifying at least one of said wait starting time or said wait ending time is based, at least in part, on geofence information associated with at least one geofence region.

11. The method as recited in claim 10, wherein said geofence information comprises a threshold geofence distance, and further comprising, with said mobile station:
in response to a determination that a routable distance associated with at least a portion of said route is less than said threshold geofence distance, gathering said delay zone information at least with regard to said at least one geofence region.

12. The method of claim 1 wherein said delay zone information comprises a weighted average of at least one current delay estimate and at least one historical delay estimate.

13. The method of claim 1, wherein said at least a section of said route is generated for an indoor environment.

14. The method of claim 13, wherein said at least a section of said route is generated to avoid traversing one or more indoor features of said indoor environment.

15. The method of claim 14, wherein said one or more indoor features include a wall.

16. The method of claim 15, wherein said at least a section of said route is generated using a graphical technique to avoid traversing said wall.

17. The method of claim 13, wherein said at least a section of said route is generated to traverse a map of said indoor environment; and
   wherein said delay zone information is operable for said device to perform said navigation operation using a copy of said map of said indoor environment.

18. The method of claim 1, wherein said at least a portion of said delay zone information is operable to identify said at least one delay zone portion during said pedestrian navigation operation for said pedestrian travel along said at least a section of said route using said device.

19. The method of claim 1, wherein said parameter associated with said navigation progress includes a velocity of said mobile station corresponding to pedestrian movement.

20. An apparatus, comprising:
   means for estimating a navigation progress of a mobile station as said mobile station traverses a route, wherein said route is generated by said mobile station for pedestrian navigation along at least a section of said route;
   means for determining that said mobile station is delayed from progressing along said at least a section of said route based on a parameter associated with said navigation progress and a corresponding expected navigation progress threshold relative to pedestrian travel along said at least a section of said route;
   means for identifying a wait starting time of at least one delay zone portion of said at least a section of said route, said identifying said wait starting time based, at least in part, on said determining that said mobile station is delayed from progressing along said at least a section of said route;
   means for determining that said mobile station is no longer delayed from progressing along said at least a section of said route;
   means for identifying a wait ending time of said at least one delay zone portion of said at least a section of said route based, at least in part, on said determining that said mobile station is no longer delayed from progressing along said at least a section of said route;
   means for, based on said wait starting time and said wait ending time, determining delay zone information associated with at least part of a period of waiting time between said wait starting time and said wait ending time, said delay zone information indicating at least a location of said at least one delay zone determined, by said one or more processors, based on a location of said mobile station at a particular time between said wait starting time and said wait ending time; and
   means for selectively transmitting at least a portion of said delay zone information, from said mobile station, to a device for use in a pedestrian navigation operation for pedestrian travel along said at least a section of said route using said device.

21. The apparatus as recited in claim 20, wherein said determining that said mobile station is no longer delayed from progressing along said route is based, at least in part, on at least one of:
   said parameter associated with said navigation progress and said corresponding expected navigation progress threshold value; or
   an estimated location of said mobile station and at least one known delay zone.

22. The apparatus as recited in claim 20, wherein said determining that said mobile station is no longer delayed from progressing along said route is based, at least in part, on at least one of:
   said parameter associated with said navigation progress and said corresponding expected navigation progress threshold value;
   an estimated location of said mobile station and at least one known delay zone;
   expiration of a waiting period threshold value;
   an occurrence of a selected action performed using said mobile station subsequent said wait starting time.

23. The apparatus as recited in claim 20, and further comprising:
   means for determining an estimated time of arrival at a destination point based, at least in part, on at least one of: said delay zone information; or an expected delay time for at least one known delay zone associated with said route.

24. The apparatus as recited in claim 23, wherein said expected delay time for said at least one known delay zone is based, at least in part, on previously gathered delay zone information associated with a plurality of mobile stations with regard to said at least one known delay zone.

25. The apparatus as recited in claim 20, wherein said portion of said delay zone information further corresponds to at least one known delay zone.

26. The apparatus as recited in claim 20, and further comprising:
   means for determining said parameter associated with said navigation progress based, at least in part, on at least one of: a current expected location of said mobile station; a current estimated location of said mobile station; or a current time.

27. The apparatus as recited in claim 20, wherein said portion of said delay zone information associated with said period of waiting time is indicative at least one of:
   said period of waiting time;
   an estimated location of said mobile station at a particular time within said period of waiting time;
   a sensed movement of said mobile station at said particular time;
   at least one selected action performed using said mobile station at said particular time; or
   at least one geofence region.

28. The apparatus as recited in claim 20, and further comprising:
   means for determining said route leading from a starting point associated with said mobile station to a destination point based, at least in part, on at least one map.

29. The apparatus as recited in claim 20, and further comprising means for identifying at least one of said wait starting time or said wait ending time based, at least in part, on geofence information associated with at least one geofence region.

30. The apparatus as recited in claim 29, wherein said geofence information comprises a threshold geofence distance, and further comprising, means for gathering said delay zone information at least with regard to said at least one geofence region, in response to a determination that a routable distance associated with at least a portion of said route is less than said threshold geofence distance.

31. A mobile station, comprising:
a network interface;
one or more processors coupled to said network interface, said one or more processors configured to:
estimate a navigation progress of said mobile station as said mobile station traverses a route, wherein said route is generated by said mobile station for pedestrian navigation along at least a section of said route;
determine that said mobile station is delayed from progressing along said at least a section of said route based on a parameter associated with said navigation progress and a corresponding expected navigation progress threshold relative to pedestrian travel along said at least a section of said route;
identify a wait starting time of at least one delay zone portion of said at least a section of said route, said identifying said wait starting time based, at least in part, on said determining that said mobile station is delayed from progressing along said at least a section of said route;
determine that said mobile station is no longer delayed from progressing along said at least a section of said route;
identify a wait ending time of said at least one delay zone portion of said at least a section of said route based, at least in part, on said determining that said mobile station is no longer delayed from progressing along said at least a section of said route;
based on said wait starting time and said wait ending time determine delay zone information associated with at least part of a period of waiting time between said wait starting time and said wait ending time, said delay zone information indicating at least a location of said at least one delay zone determined, by said one or more processors, based a location of said mobile station at a particular time between said wait starting time and said wait ending time; and
selectively transmit, via said network interface, at least a portion of said delay zone information to a device for use in a pedestrian navigation operation for pedestrian travel along said at least a section of said route using said device.

32. The mobile station as recited in claim 31, wherein said determining that said mobile station is no longer delayed from progressing along said route is based, at least in part, on at least one of:
said parameter associated with said navigation progress and said corresponding expected navigation progress threshold value; or
an estimated location of said mobile station and at least one known delay zone.

33. The mobile station as recited in claim 31, wherein said determining that said mobile station is no longer delayed from progressing along said route is based, at least in part, on at least one of:
said parameter associated with said navigation progress and said corresponding expected navigation progress threshold value;
an estimated location of said mobile station and at least one known delay zone;
expiration of a waiting period threshold value;
an occurrence of a selected action performed using said mobile station subsequent said wait starting time.

34. The mobile station as recited in claim 31, said at least one processing unit to further:
determine an estimated time of arrival at a destination point based, at least in part, on at least one of: said delay zone information; or an expected delay time for at least one known delay zone associated with said route.

35. The mobile station as recited in claim 34, wherein said expected delay time for said at least one known delay zone is based, at least in part, on previously gathered delay zone information associated with a plurality of mobile stations with regard to said at least one known delay zone.

36. The mobile station as recited in claim 31, wherein said portion of said delay zone information further corresponds to at least one known delay zone.

37. The mobile station as recited in claim 31, said at least one processing unit to further:
determine said parameter associated with said navigation progress based, at least in part, on at least one of: a current expected location of said mobile station; a current estimated location of said mobile station; or a current time.

38. The mobile station as recited in claim 31, wherein said portion of said delay zone information associated with said period of waiting time is indicative at least one of:
said period of waiting time;
an estimated location of said mobile station at a particular time within said period of waiting time;
a sensed movement of said mobile station at said particular time;
at least one selected action performed using said mobile station at said particular time; or
at least one geofence region.

39. The mobile station as recited in claim 31, said at least one processing unit to further:
determine said route leading from a starting point associated with said mobile station to a destination point based, at least in part, on at least one map.

40. The mobile station as recited in claim 31, said at least one processing unit to further identify at least one of said wait starting time or said wait ending time based, at least in part, on geofence information associated with at least one geofence region.

41. The mobile station as recited in claim 40, wherein said geofence information comprises a threshold geofence distance, and said at least one processing unit to further:
gather said delay zone information at least with regard to said at least one geofence region, in response to a determination that a routable distance associated with at least a portion of said route is less than said threshold geofence distance.

42. An article comprising:
a non-transitory computer readable medium having stored therein computer-implementable instructions that, when executed by one or more processors of a mobile station, configure said one or more processors to:
estimate a navigation progress of said mobile station as said mobile station traverses a route, wherein said route is generated by said mobile station for pedestrian navigation along at least a section of said route;
determine that said mobile station is delayed from progressing along said at least a section of said route based on a parameter associated with said navigation progress and a corresponding expected navigation progress threshold relative to pedestrian travel along said at least a section of said route;

identify a wait starting time of at least one delay zone portion of said at least a section of said route, said identifying said wait starting time based, at least in part, on said determining that said mobile station is delayed from progressing along said at least a section of said route;

determine that said mobile station is no longer delayed from progressing along said at least a section of said route;

identify a wait ending time of said at least one delay zone portion of said at least a section of said route based, at least in part, on said determining that said mobile station is no longer delayed from progressing along said at least a section of said route;

based on said wait starting time and said wait ending time, determine delay zone information associated with at least part of a period of waiting time between said wait starting time and said wait ending time, said delay zone information indicating at least a location of said at least one delay zone determined, by said one or more processors, based on a location of said mobile station at a particular time between said wait starting time and said wait ending time; and selectively initiate transmission of at least a portion of said delay zone information to a device for use in a pedestrian navigation operation for pedestrian travel along said at least a section of said route.

43. The article as recited in claim 42, wherein said determining that said mobile station is no longer delayed from progressing along said route is based, at least in part, on at least one of:

said parameter associated with said navigation progress and said corresponding expected navigation progress threshold value; or an estimated location of said mobile station and at least one known delay zone.

44. The article as recited in claim 42, wherein said determining that said mobile station is no longer delayed from progressing along said route is based, at least in part, on at least one of:

said parameter associated with said navigation progress and said corresponding expected navigation progress threshold value;

an estimated location of said mobile station and at least one known delay zone;

expiration of a waiting period threshold value;

an occurrence of a selected action performed using said mobile station subsequent said wait starting time.

45. The article as recited in claim 42, wherein said computer-implementable instructions further configure said one or more processors to:

determine an estimated time of arrival at a destination point based, at least in part, on at least one of: said delay zone information; or an expected delay time for at least one known delay zone associated with said route.

46. The article as recited in claim 45, wherein said expected delay time for said at least one known delay zone is based, at least in part, on previously gathered delay zone information associated with a plurality of mobile stations with regard to said at least one known delay zone.

47. The article as recited in claim 42, wherein said portion of said delay zone information further corresponds to at least one known delay zone.

48. The article as recited in claim 42, wherein said computer-implementable instructions further configure said one or more processors to:

determine said parameter associated with said navigation progress based, at least in part, on at least one of: a current expected location of said mobile station; a current estimated location of said mobile station; or a current time.

49. The article as recited in claim 42, wherein said portion of said delay zone information associated with said period of waiting time is indicative at least one of:

said period of waiting time;

an estimated location of said mobile station at a particular time within said period of waiting time;

a sensed movement of said mobile station at said particular time;

at least one selected action performed using said mobile station at said particular time; or at least one geofence region.

50. The article as recited in claim 42, wherein said computer-implementable instructions further configure said one or more processors to:

determine said route leading from a starting point associated with said mobile station to a destination point based, at least in part, on at least one map.

51. The article as recited in claim 42, wherein said computer-implementable instructions further configure said one or more processors to:

identify at least one of said wait starting time or said wait ending time based, at least in part, on geofence information associated with at least one geofence region.

52. The article as recited in claim 51, wherein said geofence information comprises a threshold geofence distance, and wherein said computer-implementable instructions further configure said one or more processors to:

gather said delay zone information at least with regard to said at least one geofence region, in response to a determination that a routable distance associated with at least a portion of said route is less than said threshold geofence distance.

* * * * *